(12) United States Patent
Govyadinov et al.

(10) Patent No.: US 11,680,957 B2
(45) Date of Patent: Jun. 20, 2023

(54) MICROFLUIDIC FLOW SENSOR (71) Applicant: HEWLETT-PACKARD DEVELOPMENT COMPANY, L.P., Spring, TX (US)

(72) Inventors: Alexander N. Govyadinov, Corvallis, OR (US); Pavel Kornilovich, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 364 days.

(21) Appl. No.: 16/772,390

(22) PCT Filed: Feb. 12, 2018

(86) PCT No.: PCT/US2018/017821
§ 371 (c)(1),
(2) Date: Jun. 12, 2020

(87) PCT Pub. No.: WO2019/156687
PCT Pub. Date: Aug. 15, 2019

(65) Prior Publication Data
US 2021/0072274 A1   Mar. 11, 2021

(51) Int. Cl.
*G05D 7/06* (2006.01)
*G01P 5/20* (2006.01)
(Continued)

(52) U.S. Cl.
CPC .......... *G01P 5/20* (2013.01); *B01L 3/502715* (2013.01); *G01F 1/7082* (2013.01);
(Continued)

(58) Field of Classification Search
CPC combination set(s) only.
See application file for complete search history.

(56) References Cited

U.S. PATENT DOCUMENTS

| | | |
|---|---|---|
| 3,662,598 A | 5/1972 | Spencer |
| 3,720,089 A | 3/1973 | Davis et al. |

(Continued)

FOREIGN PATENT DOCUMENTS

| | | |
|---|---|---|
| WO | WO-1998056956 | 12/1998 |
| WO | WO-2003048728 A2 | 6/2003 |

(Continued)

OTHER PUBLICATIONS

Physics Encyclopedic Dictionary; Moscow, Soviet Encyclopedia; 1983; p. 237.
(Continued)

*Primary Examiner* — Thang X Le
(74) *Attorney, Agent, or Firm* — Foley & Lardner LLP (57) ABSTRACT

A microfluidic flow sensor may include a substrate having a microfluidic channel, an inert particle source to supply a fluid carrying an inert particle to the microfluidic channel and a sensor element along the microfluidic channel and spaced from the inert particle source. The sensor element outputs a signal based upon a sensed passage of the inert particle with respect to the sensor element. Portions of the microfluidic channel proximate the sensor element have a first size and wherein the inert particle provided by the inert particle source is to have a second size greater than one half the first size.

20 Claims, 5 Drawing Sheets

(51) Int. Cl.
   *B01L 3/00* (2006.01)
   *G01F 1/7082* (2022.01)
   *G01F 1/7084* (2022.01)
   *G01F 1/7086* (2022.01)

(52) U.S. Cl.
   CPC .... *G05D 7/0676* (2013.01); *B01L 2300/0627* (2013.01); *G01F 1/7084* (2013.01); *G01F 1/7086* (2013.01)

(56) References Cited

U.S. PATENT DOCUMENTS

| | | | |
|---|---|---|---|
| 3,823,610 | A | 7/1974 | Fussell, Jr. |
| 3,861,210 | A | 1/1975 | Griverus |
| 4,167,115 | A | 9/1979 | Stoever |
| 4,429,571 | A | 2/1984 | Kullmann et al. |
| 5,103,181 | A | 4/1992 | Gaisford et al. |
| 5,365,326 | A | 11/1994 | Chrisman et al. |
| 6,437,551 | B1 | 8/2002 | Krulevitch et al. |
| 7,703,336 | B2 | 4/2010 | Genosar |
| 8,598,863 | B2 | 12/2013 | Cho et al. |
| 9,297,682 | B1 | 3/2016 | Njamfa |
| 9,410,832 | B2* | 8/2016 | Richter .............. A61M 5/16827 |
| 9,593,808 | B1* | 3/2017 | Gaitas .............. G01N 33/54366 |
| 9,714,853 | B2 | 7/2017 | Byers et al. |
| 2003/0008308 | A1 | 1/2003 | Enzelberger |
| 2003/0154036 | A1 | 8/2003 | Gysling et al. |
| 2005/0164158 | A1 | 7/2005 | Wang |
| 2006/0272384 | A1 | 12/2006 | Lewis |
| 2007/0251330 | A1* | 11/2007 | Howland .................. G01F 1/24 73/861.57 |
| 2009/0173166 | A1 | 7/2009 | Genosar |
| 2010/0155577 | A1 | 6/2010 | Kiesel et al. |
| 2010/0191482 | A1 | 7/2010 | Hasson |
| 2010/0273184 | A1 | 10/2010 | Bär |
| 2014/0311912 | A1 | 10/2014 | Shih et al. |
| 2016/0025535 | A1* | 1/2016 | Byers ........................ G01F 1/56 73/861.08 |
| 2016/0139024 | A1* | 5/2016 | Kim ................. G01N 33/48785 435/287.1 |
| 2018/0008983 | A1* | 1/2018 | McGuinness ..... B01L 3/502761 |
| 2018/0015460 | A1 | 1/2018 | Sells et al. |
| 2018/0023987 | A1 | 1/2018 | Govyadinov et al. |
| 2018/0043687 | A1* | 2/2018 | Govyadinov .......... G01N 21/27 |
| 2018/0120278 | A1* | 5/2018 | Hoorfar ............. G01N 33/0031 |
| 2018/0364143 | A1* | 12/2018 | Al Ahmad ......... G01N 15/1056 |
| 2019/0151849 | A1* | 5/2019 | Nielsen .............. G01N 35/1011 |

FOREIGN PATENT DOCUMENTS

| | | |
|---|---|---|
| WO | WO-2010065868 | 6/2010 |
| WO | WO-2016116535 | 7/2016 |
| WO | WO-2017052625 | 3/2017 |
| WO | WO-2017184187 | 10/2017 |

OTHER PUBLICATIONS

Arattano, M. et al., Measurements of Debris Flow Velocity Through Cross-correlation of Instrumentation Data, Jan. 25, 2005, Natural Hazards and Earth System Sciences (2005) 5: 137-142.

Kohler, J. et al., Generation of Microfluidic Flow Using an Optically Assembled and Magnetically Driven Microrotor, Nov. 24, 2014, J. Phys. D: Appl. Phys. 47 (2014) 505501 (8pp).

Lyu, L. et al., Mechanism of the Intermittent Motion of Two-phase Debris Flows, Sep. 20, 2016; Environ Fluid Mech (2017) 17:139-158.

* cited by examiner

MICROFLUIDIC FLOW SENSOR

CROSS-REFERENCE TO RELATED APPLICATIONS

This Utility Patent Application is a U.S. National Stage filing under 35 U.S.C. § 371 of PCT/US2018/017821, filed Feb. 12, 2018, incorporated by reference herein.

BACKGROUND

Microfabrication involves the formation of structures and various components on a substrate (e.g., silicon chip, ceramic chip, glass chip, etc.). Examples of microfabricated devices include microfluidic devices. Microfluidic devices include structures and components for conveying, processing, and/or analyzing fluids as well as the chemical and/or biochemical reactions involving such fluids.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

In many applications, the flow of a fluid in a microfluidic device is sensed or measured. Disclosed herein are example microfluidic flow sensors and methods that facilitate the sensing of fluid flow in a microfluidic device. The example microfluidic flow sensors and methods sense fluid flow without the introduction of particles or other materials that may interact with or alter the nature or chemical composition of the fluid.

The example microfluidic flow sensors and methods utilize an inert particle carried in a fluid that is directed through a microfluidic channel of the microfluidic device, wherein passage of the inert particle along the microfluidic channel is sensed. For purposes of this disclosure, an inert particle is a particle or material element which does not react with, dissolve in or change the chemical composition of the fluid in which the particle is suspended or carried. Portions of the microfluidic channel proximate the sensor element have a first size and wherein the inert particle provided by the inert particle source is controlled to have a second size greater than one half the first size. As a result, the flow of such sized inert particles occurs in a single file flow or serial fashion through a sensing region of the sensor that detects the inert particle. The single file flow or serial flow of such inert particles facilitate more accurate detection of the inert particles and more accurate determination of fluid flow rate.

In one implementation, the introduction of the inert particles is controlled such that each of the provided inert particles has a size, a diameter, greater than one half the corresponding size of those inert particle sensing portions of the microfluidic channel, those portions of the microfluidic channel where the inert particle sensors are located. For example, the inert particle carried in the microfluidic channel may be pre-filtered such that the inner particles all have a size greater than one half the size of the region of the microchannel containing the inert particle sensors.

In another implementation, the sourcing of inert particles is less controlled such as where the inert particle source may include or output inert particles of different sizes, wherein some of the inert particles are greater than one half the size of the sensing regions of the microfluidic channel and wherein other inert particles are smaller than one half the size of the sensing regions of the microfluidic channel. In such an implementation, although those smaller inert particles may overlap or proceed along the channel in a parallel fashion with one another or with inert particles having a size greater than one half the sizes sensing region of the microchannel, such smaller inert particles are not considered or are disregarded when determining a flow rate. For example, in one implementation, a controller may receive signals from an inert particle sensing device and determine the size of each of the inert particles. The controller may then compare the determined size of each inert particle to a predetermined threshold, such as a threshold corresponding to one half the size of the inert particle sensing regions of the microfluidic channel. When determining a flow rate or other determination using such inert particles, the controller may disregard those inert particles having a size less than or equal to the threshold, considering just those inert particles that meet the criteria that each individual inert particle used in flow rate determinations or other determinations have a size greater than one half the size of the sensing region of the microfluidic channel.

In some implementations, the controller may count the number of inert particles failing to meet the size criteria. In one implementation, in response to the number of inert particles failing to meet the size criteria (>½ the size of the sensing region of the channel), the percentage of inert particles failing to meet the size criteria for the number of inert particles during a predetermined period of time failing to meet the size criteria, the controller may adjust the operational parameters of the inert particle source such that a greater percentage or number of the inert particles provided satisfy the size criteria.

In one implementation, the inert particle may be introduced/dispensed directly into the microfluidic channel, introduced into a stream of fluid that is presently flowing through the microfluidic channel, wherein the inert particle source comprises an inert particle dispenser. In another implementation, the inert particle may be introduced into a volume of fluid external to the microfluidic channel or into fluid within the microfluidic channel but not yet moving through the microfluidic channel, wherein the fluid and the entrained inert particle is subsequently pumped or otherwise allowed to flow (such as under the force of gravity or capillary forces) through the microfluidic channel. In some implementations, the inert particle may be naturally present in the fluid to be directed through the microfluidic channel. For example, a fluid sample, contained in a reservoir or otherwise applied to the microfluidic channel may naturally include an inert particle which is to be sensed.

In one implementation, a controller controls a size of the inert particle and is to provide two different inert particles having different sizes, wherein both sizes are greater than one half the size of portions of the channel at which inert particles are sensed. In such an implementation, the controller may control at least one of a timing and an order at which the inert particle and the second inert particle are introduced/dispensed into the fluid to serve as a tag or tracer which may be utilized to identify a selected portion of the stream as it travels along the microfluidic channel. In some implementations, the introduced inert particle may identify a beginning of a selected portion of the stream, the end of a selected portion of the stream or other points along the stream. In some implementations, multiple inert particles may be introduced into the stream to identify a start of a selected portion of the stream and an end of the selected portion of the stream.

In another implementation, the interparticle source may provide differently sized or same sized inert particles into the fluid, wherein the inert particles have different material compositions. In such an implementation, the different material compositions may be used to distinguish different inert particles from one another. In one implementation, the time, location and such a frequency at which the inner parts are provided into the fluid may be controlled such that the different interparticle serve as markers or tracers identifying different portions of the fluid stream.

In some implementations, a stream or flow of fluid in the microfluidic device may change over time or may have different compositions or material properties along its length. Different portions of the stream of fluid may have different properties. In some implementations, different portions of an overall stream are to be interacted upon differently or are to be directed along different paths or to different destinations. An inert particle naturally present within or introduced into a selected portion of the stream may be sensed to identify where the selected portion of the stream presently resides along the microfluidic channel. The sensed location of the inert particle may be used to trigger changes in the way that different portions of the fluid stream are interacted upon. In implementations where multiple portions are tagged with multiple inert particles, the sensed inert particles may be counted, wherein the count value of a particular inert particle indicates what portion of the stream is associated with the inert particle and where the portion of stream resides in the microfluidic channel. For example, a first inert particle may correspond to a first portion of the stream, a second inert particle may correspond to a second portion of the stream and so on.

In some implementations, a microfluidic die may have a fluid device at a certain location along a microfluidic channel that is to interact with a selected portion of the stream of fluid or is to differently interact with different portions of the stream. The location of the introduced inert particle along the channel may be sensed and identified to determine when a selected portion of the stream of fluid has arrived at the fluid device, is about to arrive at the fluid device or is about to leave the fluid device. The location of the introduced inert particle along the microfluidic channel relative to the location of the fluid device along the microfluidic channel may trigger a change in the status of the fluid device. For example, the sensed arrival of the inert particle at the fluid device may cause the fluid device to be turned off, to be turned on or to have a change in its operating parameters. The sensed departure of the inert particle from the region of the microfluidic channel having the fluid device may cause the fluid device to be turned on, to be turned off or to have a change in its operating parameters. Signals from a sensor indicating that the inert particle is about to arrive at the fluid device (within a certain distance or time from the fluid device), may cause the fluid device to turn on, allowing time for the fluid device to warm up or otherwise ready itself for the arrival of the inert particle and the associated portion of the fluid stream.

In some implementations, the sensed location of the inert particle may trigger a change in a fluid device in the form of a mixer that mixes or circulates a fluid. In some implementations, the sensed location of the inert particle may trigger a change in a fluid device in the form of a fluid ejector that ejects fluid from the microfluidic passage. In some implementations, a sensed location of the inert particle may trigger a change in a fluid device in the form of a dispenser that adds or dispenses additional material or fluid into the stream of fluid. In some implementations, a sensed location the inert particle may trigger a change in a fluid device in the form of a microfluidic valve mechanism that selectively blocks fluid, allows the passage of fluid or that selectively directs fluid through one of various available paths. In some implementations, a sensed location of the inert particle may trigger a change in a fluid device in the form of a heater that provides and applies heat to at least portions of the fluid stream. In some implementations, a sensed location of the inert particle may trigger a change in a fluid device in the form of a sensor that senses at least one property of the fluid. In some implementations, a sensed location of the inert particle may trigger a change in a fluid device in the form of a pump that drives fluid along the microfluidic channel.

In some implementations, the size of the inert particle may be controlled, wherein multiple inert particles of different controlled sizes are provided and introduced into the fluid which is to presently or subsequently form a fluid stream. The timing and/order at which the differently sized inert particles are introduced into the fluid may be controlled so as to tag or mark a starting point and an endpoint of a portion of the fluid stream or so as to mark or tag different portions of a fluid stream. The differently sized inert particles are detected and distinguished from one another, allowing identification of the starting point and the endpoint of a portion of a fluid stream or allowing identification of different portions of the fluid stream.

In some implementations, the sensed location of the inert particle may be used to measure a flow rate, the speed at which the fluid is flowing along the microfluidic channel. In one implementation, the flow rate may be determined by dividing the distance from the location at which the inert particle was introduced into the microfluidic channel to the location at which the inert particle was later sensed by the amount of time elapsed from when the inert particle was introduced into the microfluidic channel to when the inert particle was later sensed. In other implementations, the flow rate may be determined by sensing the location of the inert particle at two different locations along the microfluidic channel, wherein the flow rate may be determined by dividing distance between the two locations at which the inert particle was sensed by the amount of time elapsed from when the inert particle was first sensed at the first location to when the inert particle was later sensed at the second location.

In some implementations, the microfluidic flow sensors and methods provide precise and fast speed measurements across a wide range of fluid flow rates or speeds, low flow rates and high flow rates. In some implementations, the microfluidic flow sensors and methods comprise a sensor element, a second sensor element and a third sensor element, in series, wherein the first and second sensor elements are spaced apart from one another by a first distance and wherein the second and third sensor elements are spaced apart from one another by a second distance different than the first distance. In one implementation, the sensor elements are arranged in an array. In another implementation, sensor elements are arranged in a log scale array.

The determined speed or fluid flow rate may be utilized to provide closed-loop feedback regarding the movement of fluid along the microfluidic channel. For example, the determined fluid flow rate may be compared to certain predefined thresholds, wherein the comparison may trigger a change in the rate at which the fluid is moved along the microfluidic channel. The determined fluid flow rate may cause a change in the operating parameters of a fluid pump or a change in the operating parameters of multiple fluid pumps. The determined fluid flow rate may cause a change in constrictions or filters through which the fluid flows.

In some implementations, the determined speed or fluid flow rate may be utilized to trigger changes in the manner in which a fluid device along the microfluidic channel interacts with the stream of fluid. For example, the determined fluid flow rate may be compared to certain predefined thresholds, wherein the comparison may trigger a fluid device, such as those described above, to differently interact with the stream of fluid. The operating parameters of fluid devices in the form of a fluid ejector, a material or fluid source, a fluid mixer, and microfluidic valve mechanism, a heater or an additional sensor may be changed in response to or based upon the determined fluid flow rate. The determined fluid flow rate may cause a change in the timing at which the fluid device is turned on or off based upon the expected time of arrival and/or departure of a target portion of the stream given the fluid flow rate.

The disclosed microfluidic flow sensors and methods may utilize a variety of different sensor elements to detect the presence or passage of an inert particle relative to the sensor element or elements. Examples of such sensor elements include, but are not limited to, optical emitter-detector sensors, electrical impedance sensors, capacitance sensors, acoustic sensors, thermal sensors and the like.

As will be appreciated, examples provided herein may be formed by performing various microfabrication and/or micromachining processes on a substrate to form and/or connect structures and/or components. Substrates forming the microfluidic flow sensors may comprise a silicon based wafer or other such similar materials used for microfabricated devices (e.g., glass, gallium arsenide, plastics, etc.). Examples may comprise microfluidic channels, fluid actuators, and/or volumetric chambers. Microfluidic channels and/or chambers may be formed by performing etching, microfabrication processes (e.g., photolithography), or micromachining processes in a substrate. Accordingly, microfluidic channels and/or chambers may be defined by surfaces fabricated in the substrate of a microfluidic device. In some implementations, microfluidic channels and/or chambers may be formed by an overall package, wherein multiple connected package components combine to form or define the microfluidic channel and/or chamber.

In some examples described herein, at least one dimension of a microfluidic channel and/or capillary chamber may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). For example, some microfluidic channels may facilitate capillary pumping due to capillary force. In addition, examples may couple at least two microfluidic channels to a microfluidic output channel via a fluid junction.

The microfluidic channels may facilitate conveyance of different fluids (e.g., liquids having different chemical compounds, different physical properties, different concentrations, etc.) to the microfluidic output channel. In some examples, fluids may have at least one different fluid characteristic, such as vapor pressure, temperature, viscosity, density, contact angle on channel walls, surface tension, and/or heat of vaporization. It will be appreciated that examples disclosed herein may facilitate manipulation of small volumes of liquids.

Disclosed herein is an example microfluidic flow sensor that comprises a substrate having a microfluidic channel, an inert particle source to supply an inert particle to a fluid flowing through the microfluidic channel and a sensor element along the microfluidic channel and spaced from the inert particle source. The sensor element outputs a signal based upon a sensed passage of the inert particle with respect to the sensor element. Portions of the microfluidic channel proximate the sensor element have a first size and wherein the inert particle provided by the inert particle source is controlled to have a second size greater than one half the first size Disclosed herein is an example microfluidic flow sensor that may comprise a substrate having a microfluidic channel and an inert particle source to provide an inert particle into fluid that is directed (presently or in the future) through the microfluidic channel. The microfluidic flow sensor may further comprise a first sensor element along the microfluidic channel downstream the inert particle source, the first sensor element to output a first signal based upon a sensed passage of the inert particle with respect to the first sensor element and a second sensor element along the microfluidic channel downstream the inert particle source and upstream the first sensor element. The second sensor element is to output a second signal based upon a sensed passage of the inert particle with respect to the second sensor element. A controller may determine a flow rate of the fluid based upon the first signal from the first sensor element and the second signal from the second sensor element.

Disclosed herein is an example method for sensing fluid flow through a microfluidic channel with a microfluidic flow sensor. The method may comprise supplying an inert particle in a fluid that is directed through the microfluidic channel and sensing passage of the inert particle along the microfluidic channel.

Figures 1, 2:
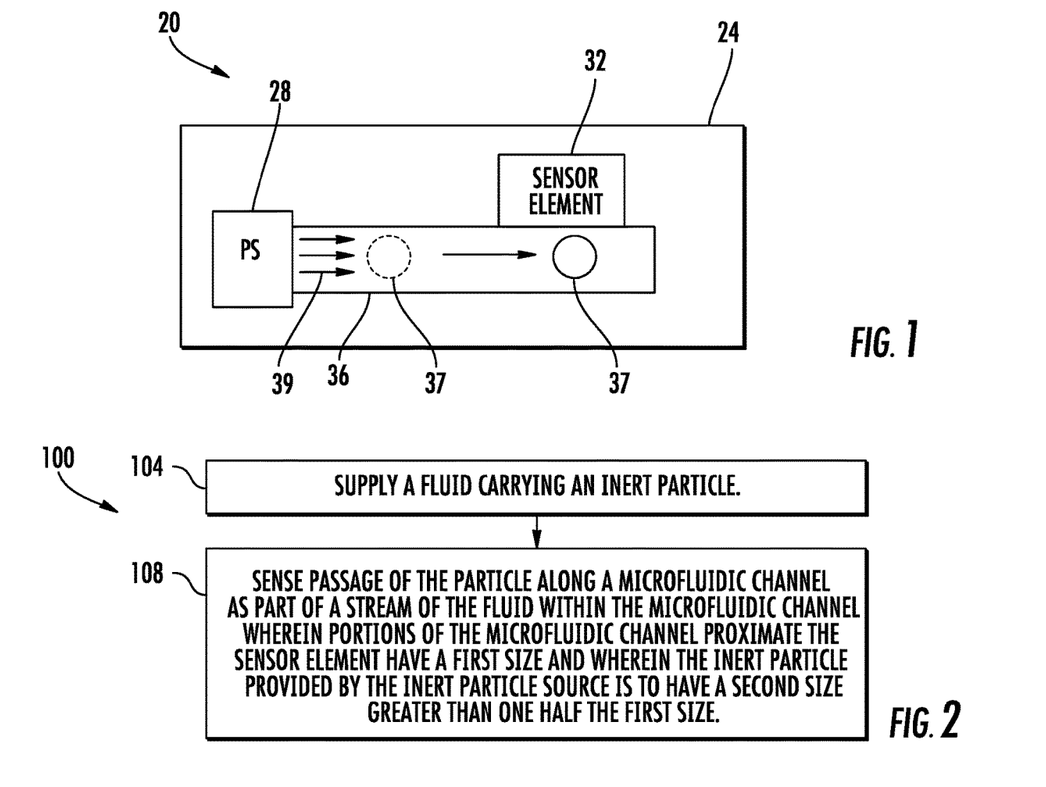
FIG. 1 is a schematic diagram illustrating portions of an example microfluidic flow sensor.
FIG. 2 is a flow diagram of an example method for sensing fluid flow.

FIG. 1 schematically illustrates portions of an example microfluidic flow sensor 20. Flow sensor 20 senses fluid flow without the introduction of particles or other materials that may interact with or alter the nature or chemical composition of the fluid. Flow sensor 20 utilizes an inert particle carried in a fluid that is being directed through a microfluidic channel of the microfluidic device, wherein passage of the inert particle along the microfluidic channel is sensed. In one implementation, the inert particle may be introduced directly into the microfluidic channel, introduced into a stream of fluid that is presently flowing through the microfluidic channel. In another implementation, the inert particle may be introduced into a volume of fluid external to the microfluidic channel or into fluid within the microfluidic channel but not yet moving through the microfluidic channel, wherein the fluid and the entrained inert particle is subsequently pumped or otherwise allowed to flow (such as under the force of gravity or capillary forces) through the microfluidic channel. In another implementation, the inert particle utilized by flow sensor 20 is an inert particle that is naturally present in the fluid or fluid sample. Flow sensor 20 comprises substrate 24, inert particle source 28 and sensor element 32.

Substrate 24 comprises a structure formed from at least one layer in which a microfluidic channel 36 extends. Substrate 24 may comprise a silicon based wafer or other such similar materials used for microfabricated devices (e.g., glass, gallium arsenide, plastics, photoresists such as SU8, etc.). FIG. 1 illustrates a portion of microfluidic channel 36. Microfluidic channel 36 extends within substrate 24 and directs a stream of fluid. Microfluidic channel 36 may have a closed end or may be part of a continuous looping arrangement. Microfluidic channel 36 may extend from a reservoir and may extend to a reservoir or waste chamber. Microfluidic channel 36 may terminate at a nozzle through which fluid is ejected or may terminate at a slot or a second channel. In one implementation, channel 36 may be of sufficiently small size (e.g., of nanometer sized scale, micrometer sized scale, millimeter sized scale, etc.) to facilitate pumping of small volumes of fluid (e.g., picoliter scale, nanoliter scale, microliter scale, milliliter scale, etc.). Microfluidic channel 36 may be formed by performing etching, microfabrication processes (e.g., photolithography), or micromachining processes in a substrate.

Inert particle source 28 comprises a mechanism that supplies a fluid carrying or in which is suspended inert particle. In one implementation, inert particle source 28 comprises a source of a fluid or a fluid sample in which the inert particle is naturally present. In another implementation, inert particle source 28 provides and introduces an inert particle 37, not previously present in the fluid or fluid sample, into fluid that is to form a stream 39 of fluid flowing through microfluidic channel 36. In one implementation, inert particle source 28 provides and introduces inert particle 37 into fluid in a controlled and consistent fashion, wherein the size and/or timing at which the inert particle is released may be controlled. In one implementation, inert particle source 28 provides an inert particle having a controlled size with a diameter of at least one half a diameter (sometimes referred to as a channel hydraulic diameter) or a minor cross-sectional dimension of passage 36 such that multiple inert particles within stream 39 cannot pass one another and travel in single-file fashion along channel 36. In one implementation, inert particle source 28 provides an inert particle having a controlled size with a diameter of at least 0.8 times the diameter or maximum cross-sectional dimension of passage 36 to enhance detection of the inert particle by sensor element 32. In some implementations, microfluidic channel 36 has a constricted region or pinch point within the sensing zone of sensor element 32, wherein inert particle source 28 provides a compressible or deformable inert particle having a controlled size with a diameter greater than the diameter or at least one cross-sectional dimension of the constricted region or pinch point for enhanced inert particle detection.

In one implementation, the inert particle source 28 may initially deposit a seed particle. In such an implementation, the fluid in which the seed particle is deposited may contain chemicals or other materials chosen so as to adhere to the seed particle providing the seed particle, increasing the size of the seed particle to a size or diameter greater than one half the size of the sensing region of the microfluidic channel.

In one implementation, the inert particle may be introduced into a stationary volume of fluid, whether residing within the microfluidic channel or within a reservoir or other volume from which fluid is drawn. In such an implementation, once formation of the inert particle 37 has been completed, a valve is opened and/or a pump is initiated to move the fluid entraining the inert particle within channel 36 as a stream. In other implementations, inert particle 37 may be created by inert particle source 28 without interrupting the ongoing stream of fluid flowing within channel 36. Although schematically illustrated as being located along the side of channel 36, in some implementations, inert particle source 28 may be at an upstream end of channel 36, such as in or adjacent to a reservoir from which fluid is taken.

Sensor element 32 comprises a sensor that outputs signals indicating presence of inert particle 36 within a sensing zone of sensor element 32. Sensor element 32 is located downstream from the inert particle source 28. Sensor element 32 outputs a signal based upon the sensed passage of inert particle 37 with respect to sensor element 32.

In some implementations, in addition to indicating the presence of the inert particle 37 at or within the sensing zone of sensor element 32, the signals from sensor element 32 may be used in combination with other information or other signals to determine a flow rate or speed of stream 39. For example, in one implementation, the flow rate of stream 39 may be determined by dividing the distance from the location at which the inert particle 37 was provided by inert particle source 28 to the location at which the inert particle 37 was later sensed by sensor element 32 by the amount of time elapsed from when the inert particle was provided to when the inert particle was later sensed. In other implementations, the flow rate may be determined by sensing the location of the inert particle at two different locations along the microfluidic channel, wherein the flow rate may be determined by dividing distance between sensor element 32 and a second additional sensor element that sensed the presence of inert particle 37 by the amount of time elapsed from when the inert particle was first sensed by sensor element 32 to when the inert particle was later sensed at the second sensor element downstream from sensor element 32. As discussed above, the presence of inert particle 37 or the fluid flow rate determined in part based upon the presence of inert particle 37 may be used in a variety of fashions to automatically adjust various fluid devices that interact with the fluid such as pumps, heaters, fluid ejectors, material or fluid sources, mixers, valve mechanisms and sensors that sense a characteristic or composition of fluid about the inert particle.

FIG. 2 is a flow diagram of an example method 100 for sensing fluid flow through the microfluidic channel. Method 100 senses fluid flow through microfluidic channel to determine where a portion of a stream may presently reside in a microfluidic channel are to determine a fluid flow rate. Method 100 senses fluid flow without introducing materials or fluids that may alter the chemical composition of the fluid. Although method 100 is described in the context of being carried out by microfluidic flow sensor 20, it should be appreciated that method 100 may carried out with any of the microfluidic flow sensors and fluidic dies described hereafter or with similar fluidic dies.

As indicated by block 104, inert particle source 28 supplies the fluid carrying an inert particle. In one implementation, inert particle source 28 supplies a fluid, such as from a reservoir or fluid inlet port, wherein the inert particle 37 is naturally present in the fluid or fluid sample. In another implementation, inert particle source 28 introduces the inert particle 37 into a fluid. In one implementation, the inert particle 37 is provided and introduced into stagnant fluid, wherein the stagnant fluid is subsequently pumped or is subsequently allowed to flow, such as under the force of gravity, capillary forces and the like, as a stream within microfluidic channel 36. In other implementations, the provided inert particle is introduced directly into a currently moving stream 39 of fluid, forming the sourced fluid that carries the inert particle.

In one implementation, the inert particle being provided has a consistent and controlled size with a diameter of at least one half a diameter or a minor cross-sectional dimension of passage 36 such that multiple inert particles within stream 39 cannot pass one another and travel in single-file fashion along channel 36. In one implementation, the provided inert particle has a controlled size with a diameter of at least 0.8 times the diameter or maximum cross-sectional dimension of passage 36 to enhance detection of the inert particle by sensor element 32. In some implementations, microfluidic channel 36 has a constricted region or pinch point within the sensing zone of sensor element 32, wherein the provided inert particle is compressible or flexible and has a controlled size with a diameter greater than the diameter or at least one cross-sectional dimension of the constricted region or pinch point, wherein the inert particle compresses or flexes to fit within passage 36. The more complete occlusion or filling of passage 36 may facilitate enhanced inert particle detection.

As indicated by block 108, the passage of the inert particle along the microfluidic channel 36 as part of the stream within the microfluidic channel is sensed. For example, sensor element 32 may sense the presence of inert particle 37 within its sensing zone and output signals indicating such presence. As discussed above, the signals output by sensor element 32 may be used to directly trigger a change in at least one fluid device along microfluidic channel 36 and/or may be used to determine a fluid flow rate or speed, wherein the determined flow rate or speed triggers a change in at least one fluid device along microfluidic channel 36. In some implementations, the determined fluid flow rate provides closed-loop feedback facilitating precise control over the actual fluid flow rate along a microfluidic channel 36.

Figure 3:
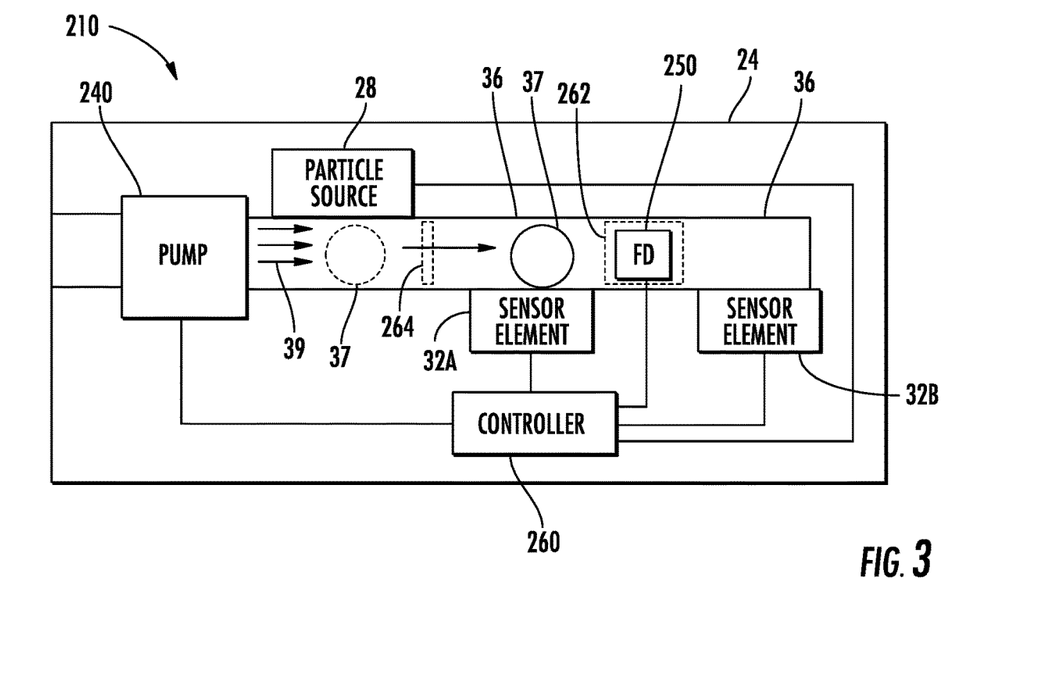
FIG. 3 is a schematic diagram of portions of an example fluidic die incorporating an example microfluidic flow sensor.

FIG. 3 schematically illustrates portions of a fluidic die 210 that incorporates a microfluidic flow sensor similar to microfluidic flow sensor 20 described above. Fluidic die 210 comprises substrate 24, inert particle source 28, sensor elements 32A, 32B (collectively referred to as sensor elements 32), pump 240, fluid device 250 and controller 260. Substrate 24 is similar to substrate 24 described above, including a microfluidic channel 36 through which a stream 39 of fluid may flow in the direction indicated by the arrows. Inert particle source 28 is similar to inert particle source 28 of sensor 20 described above.

Sensor elements 32 are each similar to sensor element 32 described above. In the example illustrated, sensor element 32A is located proximate to an upstream side of fluid interaction zone 262 of fluid device 250. Sensor element 32B is located proximate to a downstream side of fluid interaction zone 262 of fluid device 250. The fluid interaction zone 262 is a region where fluid device 250 interacts with the stream 39 of fluid flowing through microfluidic passage 36. Zone 262 may be the region where fluid device 250 heats, pumps, senses, directs with a valve, mixes, ejects with a nozzle or supplements the fluid with additional materials or fluids.

Sensor element 32A indicates when the portion of the stream 39 containing inert particle 37 has reached or arrived at fluid interaction zone 262. As described above, in some implementations, signals from sensor elements 32A indicating the arrival of the portion of stream 39 containing inert particle 37 at zone 262 may trigger a change in the state of fluid device 250. Sensor element 32B indicates when the portion of the stream 39 containing inert particle 37 is departing or moving away from fluid interaction zone 262. As described above, in some implementations, signals from sensor elements 32B indicating the departure of the portion of stream 39 containing inert particle 37 from zone 262 may trigger a change in the state of fluid device 250. In some implementations, fluidic die 210 may omit one of sensor elements 32, such as where the arrival or departure time is not used to control fluid device 250.

Pump 240 comprises a device that displaces fluid so as to move fluid along microfluidic channel 36. In one implementation, pump 240 comprises an inertial pump. For example, pump 240 may comprise a fluid actuator asymmetrically located along microfluidic channel 36 with respect to a reservoir such that the fluid actuator, upon being actuated, pumps fluid away from the reservoir. Examples of a fluid actuator that may be utilized as part of an inertial pump include, but are not limited to, thermal actuators, piezo-membrane based actuators, electrostatic membrane actuators, mechanical/impact driven membrane actuators, magnetostrictive drive actuators, electrochemical actuators, external laser heaters, other such microdevices, or any combination thereof. In some examples, fluid actuators may be formed in microfluidic channels by performing various microfabrication processes. In other implementations, pump 240 may comprise other micro-electromechanical systems (MEMS) that form a fluidic pump.

Fluid device (FD) 250 comprises a device that interacts with the fluid within microfluidic channel 36. As described above, fluid device 250 may interact with fluid within a fluid interaction zone 262. Fluid device 250 (schematically shown) may comprise any one of a variety of different fluid devices such as a fluid mixer/agitator, a valve mechanism that blocks or redirects fluid, a fluid ejector having a fluid actuator (described above) that ejects fluid through a nozzle, a heater, a cooling device, a dispenser that dispenses a material or fluid into the stream within microfluidic channel 36, or an additional sensing device that senses a composition or characteristic, such as temperature, of the fluid adjacent or in close proximity to the inert particle. For example, the sensing device forming fluid device 250 may comprise a temperature sensor, an optical sensor or another form of a fluid sensor.

Controller 260 comprises electronic circuitry, such as a processing unit or integrated circuit, that follows instructions contained in a non-transitory computer readable medium or logic. Controller 260 receives signals from and outputs control signals to each of inert particle source 28, sensor elements 32, pump 240 and fluid device 250. Controller 260 may output control signals causing method 100 to be carried out.

In one implementation, controller 260 outputs control signals causing inert particle source 28 to provide and introduce inert particle 37. As described above, in one implementation, controller 260 may output control signals such that pump 240 is pumping or moving fluid at a reduced rate or is inactive such that the provided inert particle is formed in a slow or stagnant volume of fluid. In one implementation, the inert particle may be provided and introduced into a reservoir from which pump 240 draws fluid. In some implementations, an active or passive valve 264 may be located within passage 36 to block flow of fluid when inert particle 37 is being provided, wherein the valve 264 is opened, either in response to fluid pressure provided by pump 240 or under active control in response to signals from controller 260 after inert particle 37 has been provided. In other implementations, controller 260 may output control signals to pump 240 and inert particle source 28 such that inert particle source 28 introduces inert particle 37 into an existing stream 39 of fluid.

In one implementation, controller 260 may control inert particle source 28 such that each of the provided inert particles has a size, a diameter, greater than one half the corresponding size of those inert particle sensing portions of the microfluidic channel 36, those portions of the microfluidic channel where the inert particle sensors are located. For example, in one implementation where inert particle source 28 comprises a thermal resistor, the amount of heat or the rate at which heat is provided to form the inert particle may be controlled to control the size of the inert particles being created.

In another implementation, the dispensing of inert particles by the inert particle source 28 and/or controller 260 is less controlled such as where the inert particle source 28 may provide or output inert particles of different sizes, wherein some of the inert particles are greater than one half the size of the sensing regions of the microfluidic channel and wherein other inert particles are smaller than one half the size of the sensing regions of the microfluidic channel 36. In such an implementation, although those smaller inert particles may overlap or proceed along the channel 36 in a parallel fashion with one another or with inert particles having a size greater than one half the sizes sensing region of the microfluidic channel 36, such smaller inert particles are not considered or are disregarded when determining a flow rate. For example, in one implementation, controller 260 may receive signals from at least one of sensor elements 32 and may determine the size of each of the inert particles. The controller 260 may then compare the determined size of each inert particle to a predetermined and stored threshold, such as a threshold corresponding to one half the size of the inert particle sensing regions of the microfluidic channel 36. When determining a flow rate or other determination using such inert particles, the controller may disregard those inert particles having a size less than or equal to the threshold, considering just those inert particles that meet the criteria that each individual inert particle used in flow rate determinations or other determinations have a size greater than one half the size of the sensing region of the microfluidic channel 36.

In one implementation, controller 260 outputs control signals controlling inert particle source 28 such that inert particle source 28 provides and outputs differently sized inert particles 37, wherein each of the different inert particles has a controlled size that is greater than one half the size of the inert particle sensing regions of the microfluidic channel 36. The differently sized inert particles may result in sensor elements 32 outputting different electrical signals, wherein controller 260 may differentiate between the differently sized inert particles. For example, differently sized inert particles may cause different changes in impedance where sensor elements 32 each comprise an impedance sensor.

In such an implementation, the time at which the differently sized inert particles are introduced may be such that the differently sized inert particles identify or tag different portions of the stream of fluid. For example, a first portion of a stream of fluid may be tagged with a first sized inert particle while a second portion of the stream of fluid, possibly having a different composition or characteristic, is tagged with a second sized inert particle. With such different tagging of different portions, controller 36 may utilize signals from sensor elements 32 to identify what specific portion of the stream is presently entering, passing through and/are departing the sensing zone of the different sensing elements 32. In one implementation, a starting point and the endpoint of a single portion of the stream may be identified with differently sized inert particles, facilitating the identification of the ending point and starting point of a particular portion of a stream of fluid by controller 260.

Controller 260 receives signals from sensors 32 indicating the presence of inert particle 37 as inert particle 37 passes through the sensing zone of each of sensor elements 32. In one mode of operation, controller 260 may automatically output control signals that changes the operational status of fluid device 250 based upon the sensed presence of inert particle 37 within the sensing zone of sensor element 32A. In one mode of operation, controller 260 may automatically output control signals a change the operational status of fluid device 250 based upon the sensed presence of inert particle 37 within the sensing zone of sensor element 32B. Changes in the operational status of fluid device 250 may involve a change in the heat being output by device 250 within zone 262, may involve the frequency at which fluid drops are ejected through nozzle or the size of the fluid droplets being ejected through a nozzle from zone 262, may involve the sensing of characters the fluid proximate inert particle 37, may involve the state of a valve or the direction in which fluid is directed by the valve within zone 262, may involve the frequency or rate at which the material or fluid is added to the stream within zone 262 or may involve the frequency or force by which the stream of fluid is mixed within the zone 262.

In another mode of operation, controller 260 may determine a fluid flow rate. The fluid flow rate may be determined based upon the time at which the inert particle is provided by inert particle source 28 and its detection at either or both of sensor elements 32. The fluid flow rate may be determined based upon the time that it takes for inert particle 37 to be sensed by sensor element 32A, travel to sensor element 32B and then be sensed by sensor element 32B, indicating the flow rate/speed of the fluid across fluid device 250.

Controller 260 may output control signals based upon the determined flow rate. For example, controller 260 may adjust the polling or sensing frequency of sensor elements 32 based upon the determined flow rate. Controller 260 may adjust other operational parameters of sensor elements 32 based upon the determined flow rate. Controller 260 may adjust the rate at which fluid is being pumped by pump 240 based upon the determined flow rate. Controller 260 may adjust the frequency at which inert particles are provided or the size of such inert particles being provided by inert particle source 28 based upon the determined flow rate. Controller 260 may adjust an operational parameter or status of fluid device 250 based upon the determined flow rate.

Figure 4:
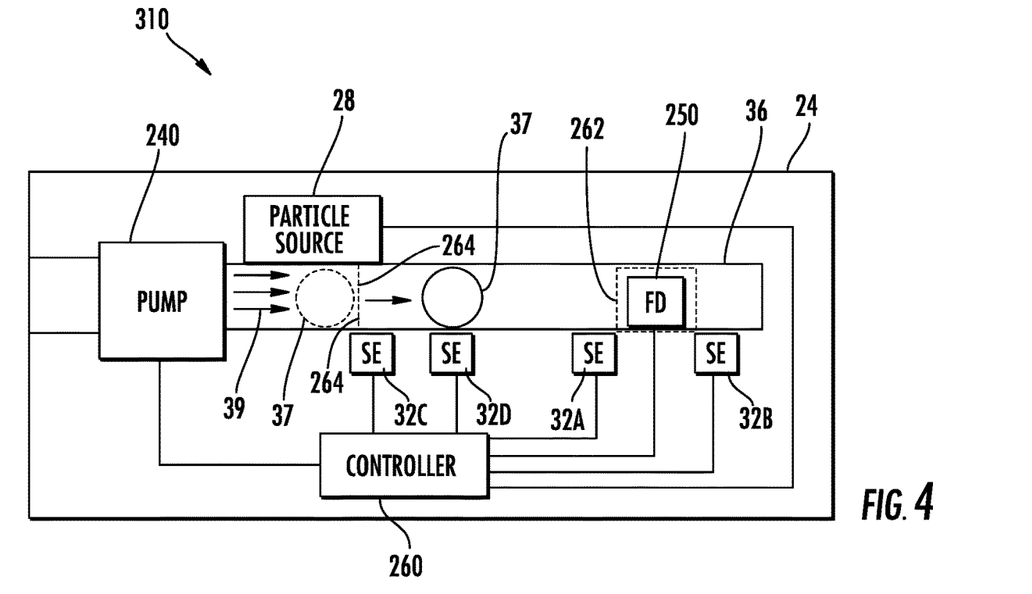
FIG. 4 is a schematic diagram of portions of an example fluidic die incorporating an example microfluidic flow sensor.

FIG. 4 schematically illustrates portions of another example fluidic die 310. Fluidic die 310 is similar to fluidic die 210 except that fluidic die 310 additionally comprises sensor elements 32C and 32D. Sensor elements 32C and 32D are similar to sensor element 32 described above. Sensor element 32C and 32D are spaced from one another along a microfluidic channel 36 downstream of inert particle source 28 and upstream of sensor element 32A. Sensor element 32D is downstream from sensor element 32C. As with other sensor elements 32, sensor elements 32C and 32D each output signals in response to or based upon the presence of inert particle 37 within the sensing zone of the respective sensor element.

Sensor elements 32C and 32D facilitate the detection of the presence of inert particle 37 at two different locations upstream and prior to fluid interaction zone 262 of fluid device 250. Sensor elements 32C and 32D further facilitate the detection of the fluid flow rate upstream of sensor element 32A, independent of any fluid flow rate that may be determined using signals from sensors 32A and/or 32B.

Moreover, sensor elements 32C and 32D facilitate precise and fast speed measurements across a wide range of fluid flow rates or speeds, low flow rates and high flow rates. As shown by FIG. 4, sensor elements 32C and 32D are spaced apart from one another by a first distance while sensor elements 32D and 32A are spaced by a second distance greater than the first distance and while sensor elements 32C and 32A are spaced by a third distance greater than the second distance. In circumstances where the fluid flow rate is low, controller 260 may determine the fluid flow rate using signals from the closer sensors. In circumstances where the fluid for rate is high, above a predefined threshold, controller 260 may determine the fluid flow rate using signals from pairs of sensors that are farther apart, maintaining the timeliness of the determination of fluid flow rate along with the precision across the wide range of fluid flow rates. Controller 260 may determine which signals from which sensor elements to utilize based upon an initial determined fluid flow rate from any of the pair of sensors.

Figure 5:
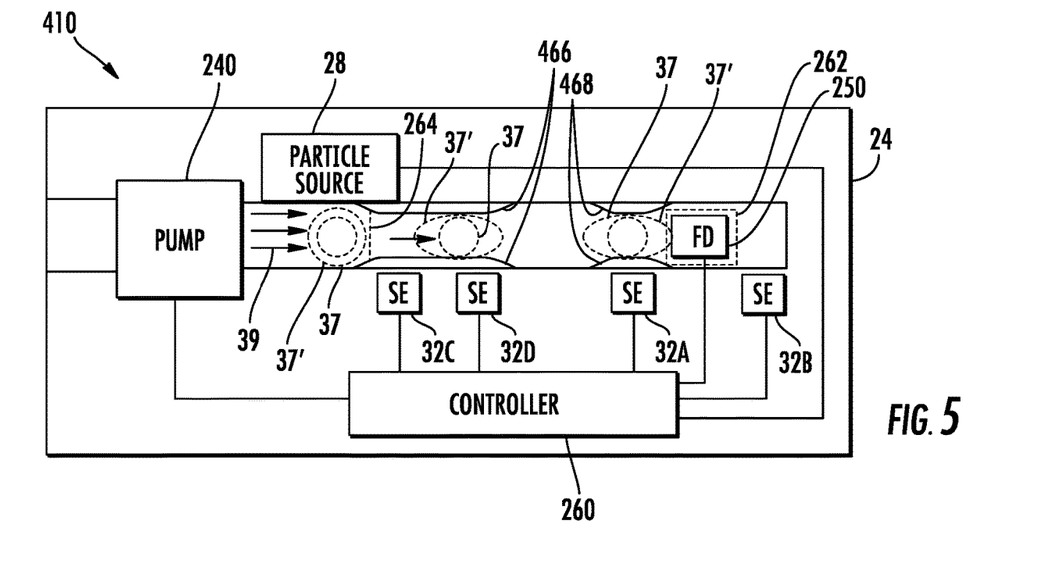
FIG. 5 is a schematic diagram of portions of an example fluidic die incorporating an example microfluidic flow sensor.

FIG. 5 schematically illustrates portions of another example fluidic die 410. Fluidic die 410 is similar to fluidic die 310 except that fluidic die 410 additionally comprises constrictions or pinch points 466, 468. Those remaining components of fluidic die 410 which correspond to components of fluidic die 310 are numbered similarly.

Pinch point 466 comprises a region of microfluidic channel 36 extending along or adjacent to sensing elements 32C and 32D, across their sensing zones, and having a reduced cross-sectional area or flow area (sometimes referred to as a hydraulic diameter or dimension). The reduced flow area results in inert particle 37 occupying a larger percentage of pinch point 466 as compared to other regions of microfluidic passage 36 lacking such a pinch point. In one implementation, the pinch point has a hydraulic diameter of no greater than 80% of the hydraulic diameter of other regions of channel 36 which are not pinched). In one implementation, the constriction provided by pinch point 466 is sized such that inert particle 37 occupies at least 80% of the hydraulic diameter or cross-sectional area of pinch point 466. In one implementation, the constriction provided by pinch point 466 is sized such that inert particle 37 fully occupies the cross-sectional area of pinch point 466. In yet other implementations, the constriction provided by pinch point 466 is sized less than the corresponding dimension of inert particle 37' such that inert particle 37' is squeezed into an oval shape (as shown by broken lines in FIG. 5) as it passes through the pinch point 466. As the percentage of the pinch point 466 occupied by inert particle 37, 37' increases, the ability of sensor elements 32 to detect the presence of inert particle 37, 37' also increases.

Pinch point 468 is similar to pinch point 466 except that pinch point 468 extends across the sensing zone of sensor elements 32A. Pinch point 468 increases the inert particle detecting performance of sensor element 32A. In some implementations, a pinch point similar to pinch points 466 and 468 may additionally be provided across the sensing zone of sensor element 32B.

Figure 6:
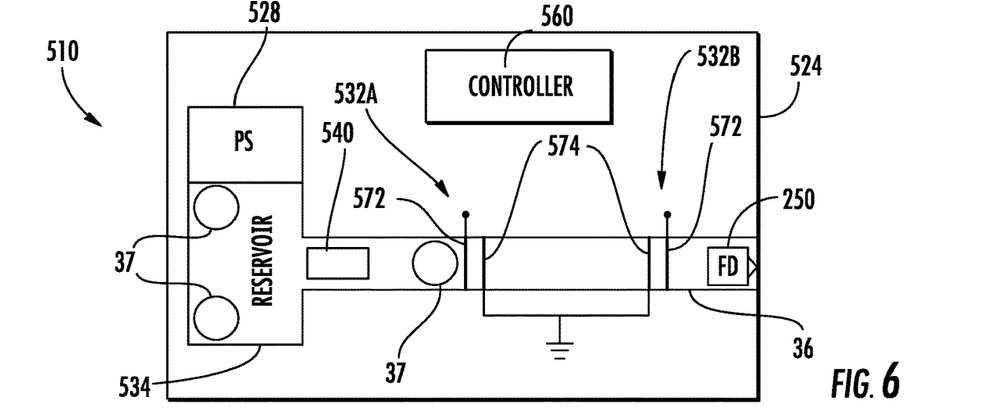
FIG. 6 is a schematic diagram of portions of an example fluidic die incorporating an example microfluidic flow sensor.

FIG. 6 schematically illustrates portions of an example fluidic die 510. Fluidic die 510 comprises substrate 524, inert particle source 528, sensor elements 532A, 532B (collectively referred to as sensor elements 532), pump 540, fluid device 250 (described above) and controller 560. Substrate 524 is similar to substrate 24 described above except that substrate 524 is specifically illustrated as comprising reservoir 534 in addition to microfluidic channel 36. Reservoir 534 comprises a chamber or volume fluidly connected to microfluidic channel 36 and from which fluid is drawn to form the stream of fluid flowing through channel 36.

Inert particle source 528 is similar to inert particle source 28 described above except the inert particle source 528 provides and specifically introduces inert particles 37 into reservoir 534. Inert particle source 528 provides inert particles 37 having a consistent and controlled size, in contrast to haphazard and randomized inert particles. In one implementation, the diameter d of inert particles 37 is controlled so as to be comparable to the channel hydraulic diameter D of passage 36. In one implementation, the size of each inert particle 37 is controlled such that multiple inert particles within the stream cannot pass one another and travel in single-file fashion along channel 36. For example, each inert particle has a controlled size of at least 0.5D. In one implementation, inert particle source 528 provides an inert particle having a controlled size with a diameter of at least 0.8 times the diameter or maximum cross-sectional dimension of passage 36 to enhance detection of the inert particle by sensor element 32. Small inert particles may not indicate or be representative for average flow. In some implementations, microfluidic channel 36 has a constricted region or pinch point, similar to as shown in FIG. 5, within the sensing zone of sensor elements 532. In one implementation, the pinch point has a hydraulic diameter of no greater than 0.8D (no greater than 80% of the hydraulic diameter of other regions of channel 36 which are not pinched). In some implementations, inert particle source 528 provides an inert particle having a controlled size with a diameter greater than or equal to the diameter or at least one cross-sectional dimension of the constricted region or pinch point for enhanced inert particle detection.

Sensor elements 532 are similar to sensor elements 32C and 32D except that sensor elements 532 are each specifically illustrated as comprising sensor elements in the form of impedance sensors. Sensor elements 532 are spaced from one another along microchannel 36. The sensor spacing may be chosen based upon the anticipated fluid flow rate range and a target response time for determining fluid flow rate.

Each of sensor elements 532 outputs signals based upon changes in electrical impedance brought about by the presence of an inert particle 37 flowing through the sensing zone of the sensor element 532 and impacting impedance of the electrical field across or within the sensing zone. In one implementation, each of sensor elements 532 comprises an electrically charged high side electrode 572 and a low side electrode formed within or integrated within a surface of channel 36, consecutive electrodes 572 and 574 forming the sensing zone for the sensor element. In one implementation, electrodes 572, 574 comprise thin strips or segments of electrically conductive material, such as metal. The sensing zone contains an electric field between high side electrode 572 and low side electrode 574. The presence of an inert particle 37 interrupts or obstructs electric field lines such that the presence of an inert particle is characterized by the electrical signals from electrode 572, representing changes in impedance, have longer ramp ups and ramp downs.

In one implementation, the low side electrode 574 is electrically grounded. In one implementation, both electrodes may be biased for impedance sensing. Electrodes 572 and 574 extend across microfluidic channel 32 at spaced locations in a serial fashion, being spaced from one another in a direction along channel 36. The spacing of electrodes 572 and 574 of each of sensor elements 532 is comparable to the diameter d of inert particle 37. In one implementation, the electrode spacing is at least 0.2d and no greater than 2d. It should be appreciated that the order of electrodes 572 and 574 of each sensor elements 532 illustrated in FIG. 6 may be reversed. Each of the electrically charged electrodes 574 is electrically coupled to controller 560, directly or indirectly, such that controller 560 may sense changes in the impedance impacting electrical current flow through electrodes 572.

Pump 540 is similar to pump 240 described above except that pump 540 is specifically illustrated as extending adjacent to an outlet or mouth of reservoir 534. In one implementation, pump 540 is an inertial pump. In one implementation, pump 540 is an inertial pump utilizing a thermal resistor as a fluid actuator. Pump 540 draws fluid from reservoir 534 to form a stream of fluid flowing along microfluidic channel 36, across sensor elements 532.

Controller 560 is similar to controller 260 described above except that controller 560 receives signals from sensor elements 532 and determines the presence of or absence of an inert particle 37 in the flow or stream of fluid based upon impedance changes as indicated by signals from the electrodes 572. As with controller 260, controller 560 utilizes the detected presence or absence of an inert particle at each of sensor elements 532 to trigger changes in the operational state of fluid device 250. As with controller 260, controller 560 may calculate a fluid flow rate and adjust the operational status of fluid device 250, inert particle source 528 and/or pump 540 based upon the determined fluid flow rate. In some implementations, controller 560 may adjust the operation of sensor elements 532 based upon the determined flow rate or based upon the presence or absence of an inert particle. For example, upon sensor element 532A indicating the presence of an inert particle, controller 560 may initiate polling of sensor element 532B for a predefined window of time.

Figure 7:
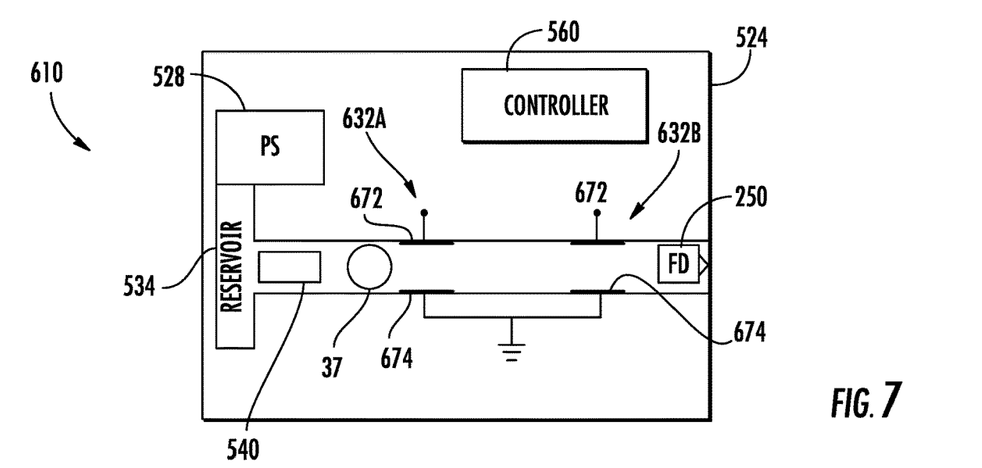
FIG. 7 is a schematic diagram of portions of an example fluidic die incorporating an example microfluidic flow sensor.

FIG. 7 schematically illustrates portions of an example fluidic die 610. Fluidic die 610 is similar to fluidic die 510 except that fluidic die 610 comprises sensor elements 632A and 632B (collectively referred to as sensor elements 632) in place of sensor elements 532. Those remaining components of fluidic die 610 which correspond to components of fluidic die 510 are numbered similarly.

Sensor elements 632 each comprise an impedance sensor. Unlike the impedance sensors 532, sensor 632 have electrodes extending on or adjacent to opposite surfaces of microfluidic channel 36. In the example illustrated, each of sensor elements 632 comprises a high side electrode 672 on a first surface of channel 36 and a low side electrode 674 on an opposite surface of channel 36. In one implementation, the low side electrodes 674 may be grounded. In another implementation, both electrodes may be differently biased. Although high side electrodes 672 are illustrated as being on one surface while low side electrodes 674 illustrated as being on an opposite surface, in other implementations, the high side electrode 672 of one of sensor elements 632 and the low side electrode 674 of the other sensor elements 632 may be located on the same surface of channel 36. In one implementation, each of such electrodes 672, 674 has a length extending in the direction in which channel 36 extends of between 20% of the diameter of inert particle 37 and no greater than two times the diameter of inert particle 37. Each of such electrodes 672, 674 may have various shapes such as thin strip lines, rectangles, triangles facing one another and so forth.

Figure 8:
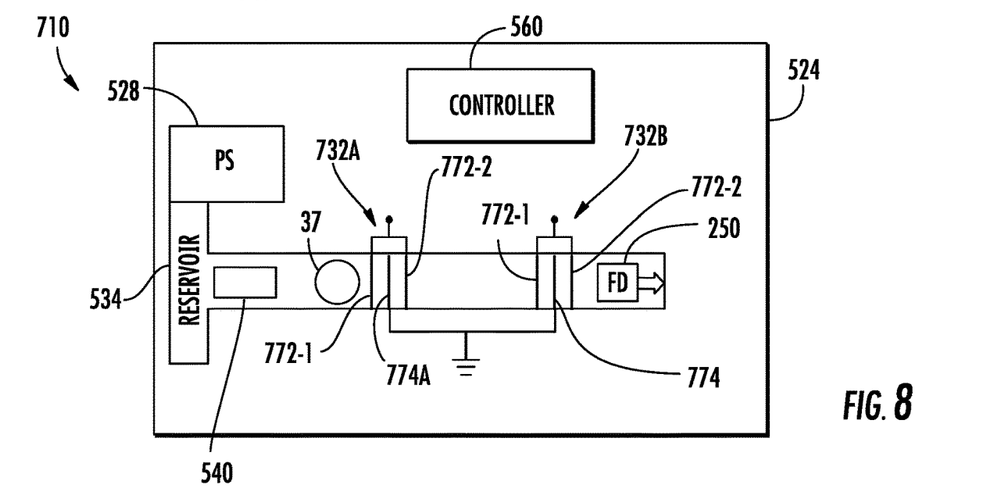
FIG. 8 is a schematic diagram of portions of an example fluidic die incorporating an example microfluidic flow sensor.

FIG. 8 schematically illustrates portions of an example fluidic die 710. Fluidic die 710 is similar to fluidic die 510 except that fluidic die 610 comprises sensor elements 732A and 732B (collectively referred to as sensor elements 732) in place of sensor elements 532. Those remaining components of fluidic die 710 which correspond to components of fluidic die 510 are numbered similarly.

Sensor elements 732 each comprise a pair of impedance sensors that share a single low side electrode. Sensor elements 732 comprises high side electrodes 772-1 and 772-2 which share or cooperate with low side electrode 774 to form two electric fields which may be interrupted by inert particle 37 causing the impedance within the individual high side electrodes 772-1 and 772-2 to change. The pair of high side electrodes facilitate a larger overall sensing zone while maintaining signal strength. In the example illustrated, each of electrodes 772-1, 772-2 and 774 are formed on a same surface of channel 36. In other implementations, low side electrodes 774A may be formed on a surface opposite to the surface containing or supporting electrodes 772-1 and 772-2.

Figure 9:
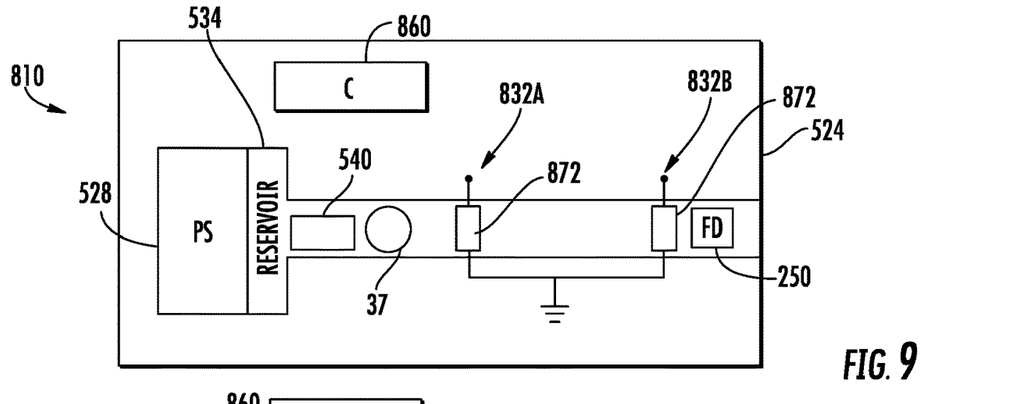
FIG. 9 is a top view schematically illustrating portions of an example fluidic die incorporating an example microfluidic flow sensor.
Figure 10:
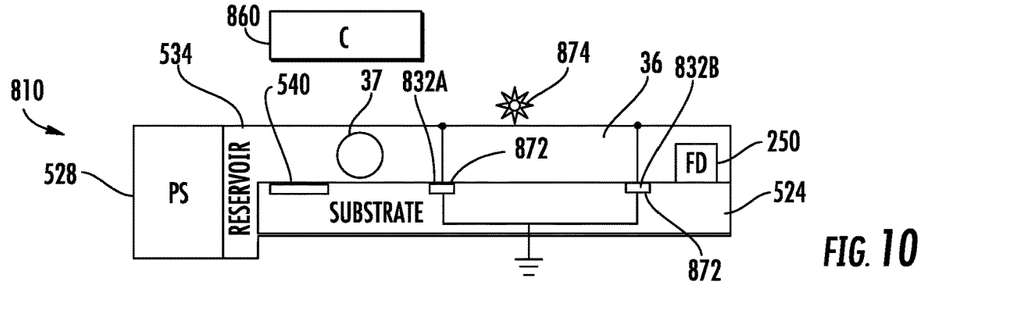
FIG. 10 is a sectional view schematically illustrating portions of the example fluidic die of FIG. 9.

FIGS. 9 and 10 schematically illustrate portions of an example fluidic die 810. FIG. 9 is a top view of die 810 while 10 is a side sectional view of die 810. Fluidic die 810 is similar to fluidic die 510 except that fluidic die 810 comprises sensor elements 832A, 832B (collectively referred to as sensor elements 832) and controller 860 in place of sensor elements 532 and controller 560, respectively. Those remaining components of fluidic die 810 which correspond to components of fluidic die 510 are numbered similarly.

Sensor elements 832 each comprise a photodetector 872 and a source of light 874. In one implementation, the source of light 874 may comprise a photo emitter. In one implementation, a source of light 874 may comprise ambient light transmitted through translucent or transparent portions overlying or adjacent to channel 36. In one implementation, each of the photo detectors 872 has a length L comparable to the size of inert particle 37 for enhanced accuracy and reliability in detecting the presence of inert particle 37. In one implementation, the length L is at least 0.2 times the diameter d an inert particle 37 and no greater than 2d. In other implementations, photodetectors 872 may have other dimensions.

Controller 860 is similar to controller 560 except that controller 860 identifies the presence or absence of inert particle 37 with respect to photodetectors 872 based upon electrical signals received from the individual photodetectors 872. As with controllers 260 and 560, controller 860 utilizes the detected presence or absence of an inert particle at each of sensor elements 832 to trigger changes in the operational state of fluid device 250. Controller 860 may calculate a fluid flow rate and adjust the operational status of fluid device 250, inert particle source 528 and/or pump 540 based upon the determined fluid flow rate. In some implementations, controller 560 may adjust the operation of sensor elements 832 based upon the determined flow rate or based upon the presence or absence of an inert particle. For example, upon sensor element 832A indicating the presence of an inert particle, controller 860 may initiate polling of sensor element 832B for a predefined window of time.

Figure 11:
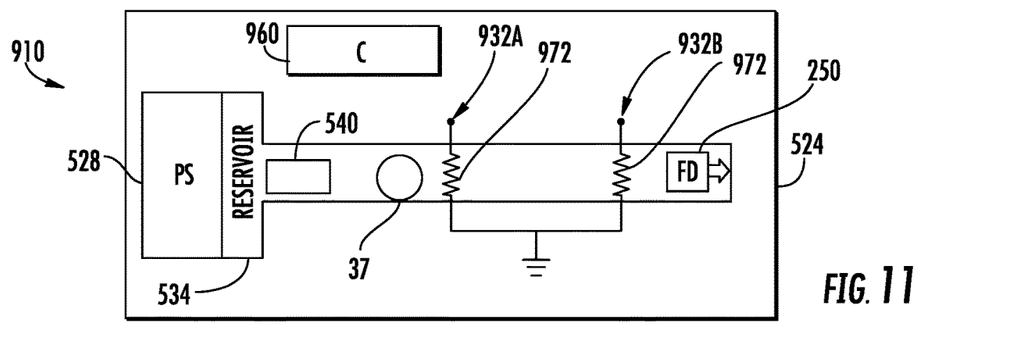
FIG. 11 is a schematic diagram of portions of an example fluidic die incorporating an example microfluidic flow sensor.

FIG. 11 schematically illustrates portions of an example fluidic die 910. Fluidic die 910 is similar to fluidic die 510 except that fluidic die 910 comprises sensor elements 932A, 932B (collectively referred to as sensor elements 932) and controller 960 in place of sensor elements 532 and controller 560, respectively. Those remaining components of fluidic die 910 which correspond to components of fluidic die 510 are numbered similarly.

Sensor elements 932 each comprise a thermal sensor 972 that senses changes in the temperature of the fluid flowing across the sensing zone of the individual thermal sensor 972. In one implementation, each thermal sensor 972 comprises a material that has an electrical resistance that changes in response to temperature changes. In response to the presence of an inert particle 37, the temperature of fluid may change, resulting in the thermal sensor experiencing a change in resistance, wherein the change of resistance is sensed to identify the presence of inert particle 37. Another example of thermal sensor 972 is a hotwire sensor which, itself, produces heat and detects a temperature response of the fluid to the provided heat. The thermal response of the fluid to the heat provided by the hotwire sensor results in the hotwire sensor experiencing a change in resistance, wherein the change of resistance is sensed to indicate the presence of inert particle 37.

Controller 960 is similar to controller 560 except that controller 960 identifies the presence or absence of inert particle 37 with respect to thermal sensor 972 based upon electrical signals received from the individual thermal sensors 972. As with controllers 260 and 560, controller 960 utilizes the detected presence or absence of an inert particle at each of sensor elements 932 to trigger changes in the operational state of fluid device 250. Controller 960 may calculate a fluid flow rate and adjust the operational status of fluid device 250, inert particle source 528 and/or pump 540 based upon the determined fluid flow rate. In some implementations, controller 960 may adjust the operation of sensor elements 932 based upon the determined flow rate or based upon the presence or absence of an inert particle. For example, upon sensor element 932A indicating the presence of an inert particle, controller 960 may initiate polling of sensor element 932B for a predefined window of time.

Figure 12:
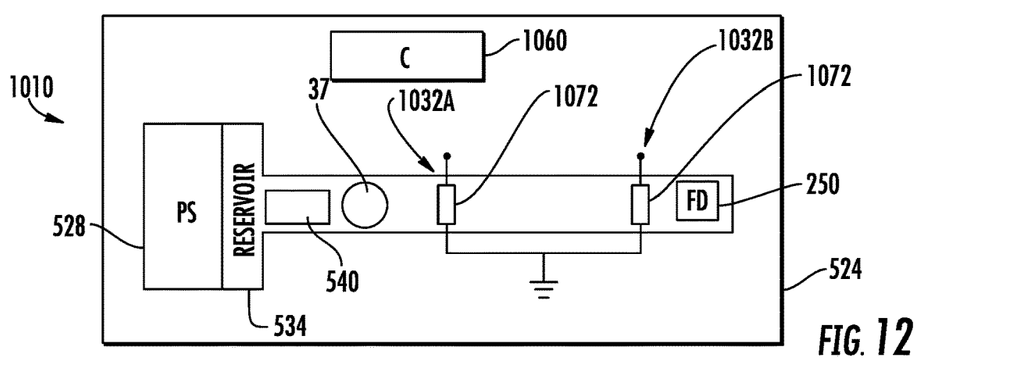
FIG. 12 is a schematic diagram of portions of an example fluidic die incorporating an example microfluidic flow sensor.

FIG. 12 schematically illustrates portions of an example fluidic die 1010. Fluidic die 1010 is similar to fluidic die 510 except that fluidic die 1010 comprises sensor elements 1032A, 1032B (collectively referred to as sensor elements 1032) and controller 1060 in place of sensor elements 532 and controller 560, respectively. Those remaining components of fluidic die 1010 which correspond to components of fluidic die 510 are numbered similarly.

Sensor elements 1032 each comprise an acoustic sensor 1072 that senses changes in fluid density resulting from a change in the oscillating frequency of the fluid flowing across the sensing zone of the individual acoustic sensor 1072. In one implementation, each thermal sensor 1072 comprises a material that outputs electrical signals in response to sensed vibration or sounds.

Controller 1060 is similar to controller 560 except that controller 1060 identifies the presence or absence of inert particle 37 with respect to an individual acoustic sensing element 1072 based upon electrical signals received from the acoustic sensors 872. As with controllers 260 and 560, controller 1060 utilizes the detected presence or absence of an inert particle at each of sensor elements 1032 to trigger changes in the operational state of fluid device 250. Controller 1060 may calculate a fluid flow rate and adjust the operational status of fluid device 250, inert particle source 528 and/or pump 540 based upon the determined fluid flow rate. In some implementations, controller 1060 may adjust the operation of sensor elements 1032 based upon the determined flow rate or based upon the presence or absence of an inert particle. For example, upon sensor element 1032A indicating the presence of an inert particle, controller 1060 may initiate polling of sensor element 1032B for a predefined window of time.

Figure 13:
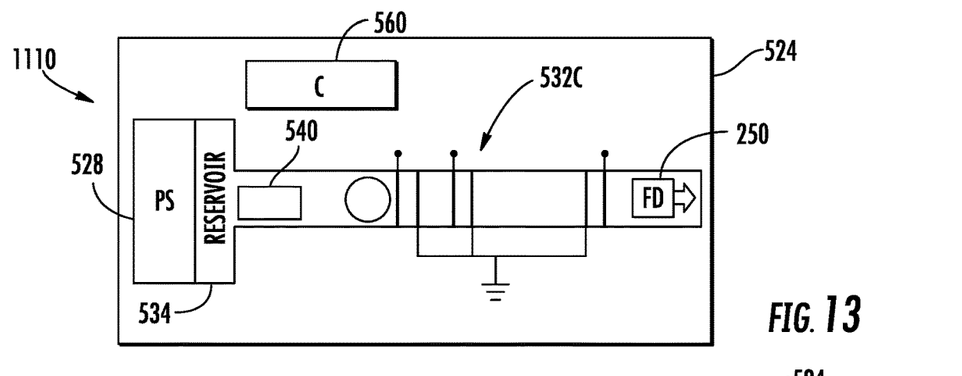
FIG. 13 is a schematic diagram of portions of an example fluidic die incorporating an example microfluidic flow sensor.

FIG. 13 schematically illustrates portions of an example fluidic die 1110. Fluidic die 1110 utilizes a sensor array to facilitate accurate and timely fluid flow rate detection across a wide range of fluid flow rates. Fluidic die 1110 is similar to fluidic die 510 except that fluidic die 510 additionally comprises sensor element 532C in addition to sensor elements 532A and 532B. Sensor element 532C is similar to sensor element 532A or 532B. Sensor elements 532A and 532C are spaced apart from one another by a first distance while sensor elements 532A and 532B are spaced by a second distance greater than the first distance. In circumstances where the fluid flow rate is low, controller 560 may determine the fluid flow rate using signals from the closer sensors. In circumstances where the fluid for rate is high, controller 560 may determine the fluid flow rate using signals from pairs of sensors that are farther apart, maintaining the timeliness of the determination of fluid flow rate along with the precision across the wide range of fluid flow rates. Controller 560 may determine which signals from which sensor elements to utilize based upon an initial determined fluid flow rate from any of the pair of sensors.

Figure 14:
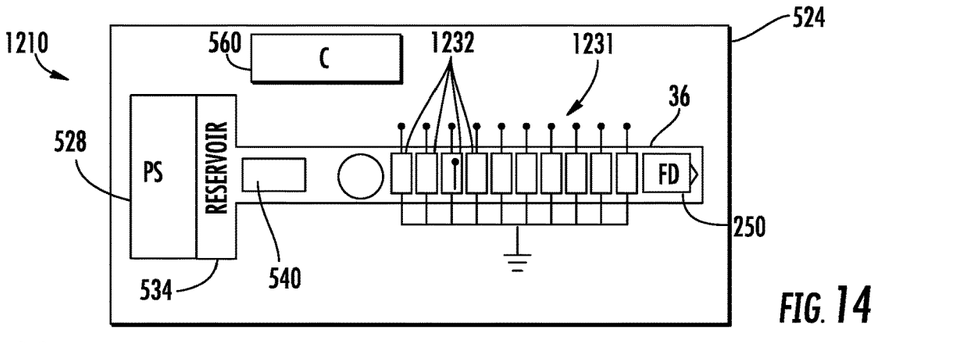
FIG. 14 is a schematic diagram of portions of an example fluidic die incorporating an example microfluidic flow sensor.

FIG. 14 schematically illustrates portions of an example fluidic die 1210. Fluidic die 1210 is similar to fluidic die 1110 except that fluidic die 1210 comprises a uniformly spaced array 1231 of sensor elements 1232 spaced along microfluidic channel 36. In one implementation, sensor elements 1332 are spaced from one another or have a center to center pitch of between 0.2 d and 2 d. Those components of fluidic die 1210 which correspond to components of fluidic die 1110 are numbered similarly. In one implementation, each of sensor elements 1232 comprise an impedance sensor similar to sensor elements 532 described above. In other implementations, each of sensor elements 1232 may comprise a sensor element similar to sensor elements 632, 732, 832, 932 or 1032 as described above. In such an implementation, controller 560 may utilize signals from a selected pair or from multiple sensor elements 1232 to determine fluid flow rate. Using signals from a multitude of sensor elements 1232 may reduce errors by providing a redundancy of measurements. The multitude of sensor elements 1232 provide increased precision at low and high flow rates with a fast response and with an increased dynamic range. In addition, signals from the individual sensor elements 1232 may identify the presence of an inert particle in the presence of the fluid adjacent the inert particle at a multitude of locations, providing a high degree of resolution as to the location of the inert particle along microfluidic channel 36. The multitude of sensor elements 1232 may further facilitate continuous tracking of other inert particles and may tolerate more than one inert particle 37 in channel 36.

Figure 15:
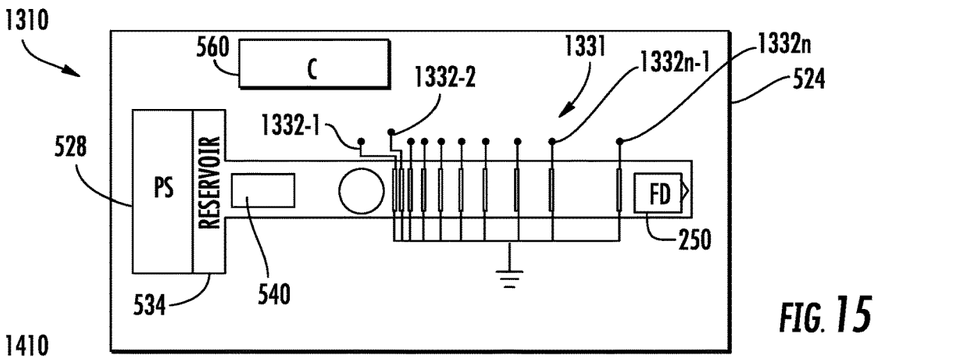
FIG. 15 is a schematic diagram of portions of an example fluidic die incorporating an example microfluidic flow sensor.

FIG. 15 schematically illustrates portions of an example fluidic die 1310. Fluidic die 1310 is similar to fluidic die 1210 except that fluidic die 1310 comprises an array 1331 of sensor elements 13321-1332n nonuniformly spaced along microfluidic channel 36. In the example illustrated, the array 1331 of sensor elements 1332 are spaced apart in accordance with a logarithmic scale, providing enhanced precision and response rates for both low and high flow rates. In one implementation, sensor elements 1332n-1 and 1332n have a spacing of between 1.0d and 10d while sensor elements 1332-1 and 1332-2 have a spacing of between 0.1d and 1.0d. Those components of fluidic die 1210 which correspond to components of fluidic die 1110 are numbered similarly. In one implementation, each of sensor elements 1332 comprise an impedance sensor similar to sensor elements 532 described above. In other implementations, each of sensor elements 1332 may comprise a sensor element similar to sensor elements 632, 732, 832, 932 or 1032 as described above. In such an implementation, controller 560 may utilize signals from a selected pair or from multiple sensor elements 1332 to determine fluid flow rate. Using signals from a multitude of sensor elements 1332 may reduce errors by providing a redundancy of measurements. In addition, signals from the individual sensor elements 1332 may identify the presence of an inert particle and the presence of the fluid adjacent the inert particle at a multitude of locations, providing a high degree of resolution as to the location of the inert particle along microfluidic channel 36.

Figure 16:
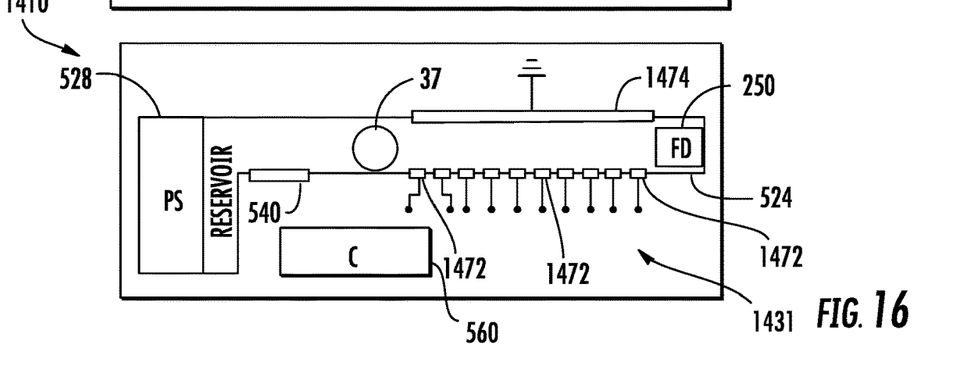
FIG. 16 is a sectional view schematically illustrating portions of an example fluidic die incorporating an example microfluidic flow sensor.

FIG. 16 is a sectional view schematically illustrating portions of an example fluidic die 1410. Fluidic die 1410 is similar to fluidic die 1210 except that fluidic die 1610 comprises an array 1431 of sensor elements 1432 spaced along microfluidic channel 36. In the example illustrated, each of sensor elements 1432 comprises a high side electrode 1472, wherein all of the high side electrodes 1472 share a single low side electrode 1474. In the example illustrated, the high side electrodes 1472 extend on a first surface of channel 36 while the single low side electrodes 1474 extends on an opposite surface of channel 36. In one implementation, the high side electrodes 1472 are uniformly spaced and have a center to center pitch of between 0.2d and 2.0d. In another implementation, the high side electrodes 1472 may be nonuniformly spaced. For example, electrodes 1472 may be logarithmically arranged similar to the arrangement of sensor elements 1332 in FIG. 15. In such an implementation, the first two electrodes 1472 of the array may have a spacing of between 0.1d and 1.0d while the last two electrodes 1472 of the array may have a spacing of between 1.0d and 10d.

In one implementation, the high side electrode 1472 and the low side electrode 1474 form individual impedance sensors that output electrical signals that may be used to detect the presence or absence of inert particle 37. In another implementation, electrodes 1472 and 1474 form individual capacitive sensors that output electrical signals that may be used to detect the presence or absence of inert particle 37 at distinct locations along channel 36. Using signals from a multitude of sensor elements 1432 may reduce errors by providing a redundancy of measurements. In addition, signals from the individual sensor elements 1432 may identify the presence of an inert particle and the presence of the fluid adjacent the inert particle at a multitude of locations, providing a high degree of resolution as to the location of the inert particle along microfluidic channel 36.

Although the present disclosure has been described with reference to example implementations, workers skilled in the art will recognize that changes may be made in form and detail without departing from the scope of the claimed subject matter. For example, although different example implementations may have been described as including features providing benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A microfluidic flow sensor comprising:
   a substrate having a microfluidic channel;
   an inert particle source to create an inert particle in a fluid and supply the fluid carrying the inert particle to the microfluidic channel; and
   a sensor element along the microfluidic channel and spaced from the inert particle source, wherein the sensor element outputs a signal based upon a sensed passage of the inert particle with respect to the sensor element, wherein portions of the microfluidic channel proximate the sensor element have a first size and wherein the inert particle provided by the inert particle source has a second size greater than one half the first size.

2. The microfluidic flow sensor of claim 1, further comprising:
   a fluid pump to drive the fluid along the microfluidic channel; and
   a controller to output control signals controlling the fluid pump based upon the signals from the sensor element, wherein the controller outputs a second control signal controlling inert particle generation by the inert particle source based upon the signals from the sensor element.

3. The microfluidic flow sensor of claim 2, wherein the second control signal adjusts a frequency at which the inert particle source provides inert particles.

4. The microfluidic flow sensor of claim 2, wherein the second control signal adjusts a size of inert particles provided by the inert particle source.

5. The microfluidic flow sensor of claim 1, further comprising a controller, the controller to determine a flow rate of the fluid based upon a time of creation of the inert particle and the signal from the sensor element.

6. The microfluidic flow sensor of claim 1, further comprising:
a second sensor element along the microfluidic channel and spaced upstream from the sensor element, the second sensor element to output a second signal based upon a sensed passage of the inert particle with respect to the second sensor element; and
a controller to determine a flow rate of the fluid based upon the second signal from the second sensor element and the signal from the sensor element.

7. The microfluidic flow sensor of claim 1, further comprising a controller, wherein the controller is to determine a flow rate of the fluid based at least in part upon sensing of the inert particle and wherein the controller is to receive a second signal from the sensor element based upon a sensed passage of a second inert particle with respect to the sensor element, wherein the controller is to determine a third size of the second inert particle based upon the second signal and disregard the second inert particle with respect to determining the flow rate of the fluid in response to the determined third size being less than one half the first size.

8. The microfluidic flow sensor of claim 1, further comprising a controller to control the inert particle source to control a size of the inert particle and to provide the inert particle having the second size and a second inert particle having a third size greater than one half the first size and different than the second size, wherein the controller controls at least one of a timing and an order at which the inert particle and the second inert particle are introduced into the fluid to tag different portions of the fluid.

9. The microfluidic flow sensor of claim 1, wherein the second size of the inert particle is at least 80% of the first size.

10. The microfluidic flow sensor of claim 1 comprising:
a second sensor element along the microfluidic channel and spaced from the sensor element on a first side of the sensor element by a first distance, the second sensor element to output a second signal based upon a sensed passage of the inert particle with respect to the second sensor element; and
a third sensor element along the microfluidic channel on the first side of the sensor element and spaced from the second sensor element by a second distance different than the first distance, the third sensor element to output a third signal based upon a sensed passage of the inert particle with respect to the third sensor element.

11. The microfluidic flow sensor of claim 2, wherein the controller is to determine a size of each inert particle provided by the inert particle source, and compare the determined size of each inert particle to a predetermined threshold.

12. The microfluidic flow sensor of claim 11, wherein the controller is to:
determine a flow rate of the fluid by disregarding inert particles having a size less than or equal to the predetermined threshold; and
output the control signal based on the determined flow rate.

13. The microfluidic flow sensor of claim 1, further comprising a controller, the controller to determine a time of creation of a first tag corresponding with a first sized inert particle of the fluid, and to determine a time of creation of a second tag corresponding with a second sized inert particle of the fluid.

14. The microfluidic flow sensor of claim 13, further comprising the controller to identify a start of a portion of the fluid by identifying a signal from the sensor element corresponding with the first tag, and to identify an end of the portion of the fluid by identifying a signal from the sensor element corresponding with the second tag.

15. A method for sensing fluid flow through a microfluidic channel with a microfluidic flow sensor, the method comprising:
supplying a fluid carrying an inert particle;
sensing, via a sensor element, passage of the inert particle along the microfluidic channel as part of a stream of the fluid within the microfluidic channel, wherein portions of the microfluidic channel proximate the sensor element have a first size and wherein the inert particle provided by the inert particle source is to have a second size greater than one half the first size; and
determining a flow rate, via a controller, of the fluid based upon a time of creation of the inert particle and a signal output from the sensor element based upon the sensed passage of the inert particle.

16. The method of claim 15, further comprising determining a flow rate of the fluid along the microfluidic channel based upon the sensed passage of the inert particle with respect to the sensor element and (A) a sensed passage of the inert particle with respect to a second sensor element spaced from the sensor element and (B) the time of creation of the inert particle.

17. The method of claim 15, further comprising determining a flow rate of the fluid based at least in part upon sensing of the inert particle and wherein the controller is to receive a second signal from the sensor element based upon a sensed passage of a second inert particle with respect to the sensor element, wherein the controller is to determine a third size of the second inert particle based upon the second signal and disregard the second inert particle with respect to determining the flow rate of the fluid in response to the determined third size being no greater than one half the first size.

18. A microfluidic flow sensor comprising:
a substrate having a microfluidic channel having a sensing region having a first size;
an inert particle source to provide a fluid carrying an inert particle to the microfluidic channel, the inert particle having a second size greater than one half the first size;
a first sensor element along the sensing region of microfluidic channel downstream the inert particle source, the first sensor element to output a first signal based upon a sensed passage of the inert particle with respect to the first sensor element;
a second sensor element along the microfluidic channel downstream the inert particle source and upstream the first sensor element, the second sensor element to output a second signal based upon a sensed passage of the inert particle with respect to the second sensor element; and
a controller to determine a flow rate of the fluid based upon the first signal from the first sensor element and the second signal from the second sensor element, wherein the flow rate is determined by disregarding respective inert particles having a size less than or equal to a predetermined threshold in the determination of the flow rate.

19. The microfluidic flow sensor of claim 18, wherein the microfluidic channel includes a constricted region within each of the first sensor element and the second sensor element, and wherein the inert particle source provides a compressible or deformable inert particle having a controlled size.

20. The microfluidic flow sensor of claim 18, wherein the controller is to determine a size of each inert particle provided by the inert particle source, and compare the determined size of each inert particle to a predetermined threshold.

* * * * *